No. 756,710. PATENTED APR. 5, 1904.
R. W. ROMIG.
INGREDIENT SCALE.
APPLICATION FILED NOV. 18, 1903.
NO MODEL.
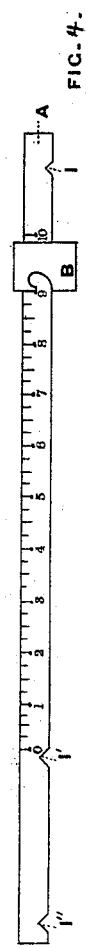
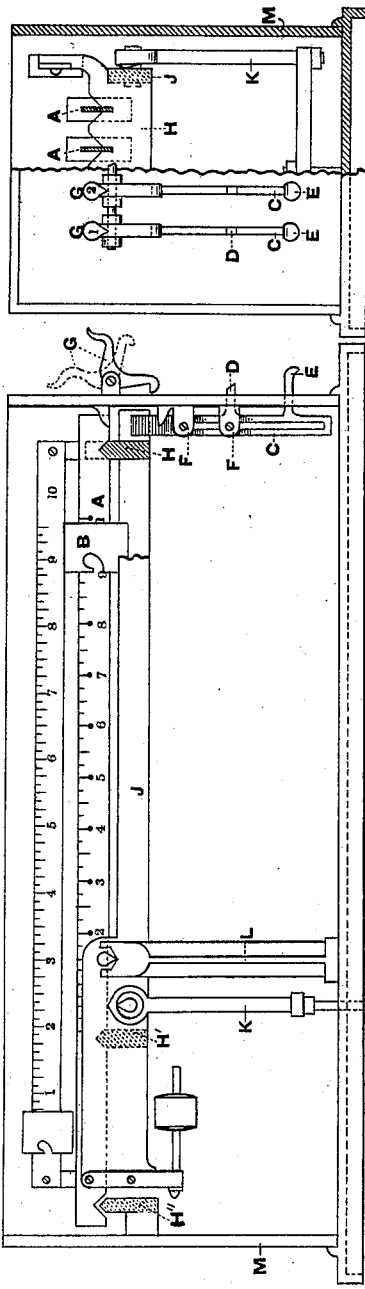
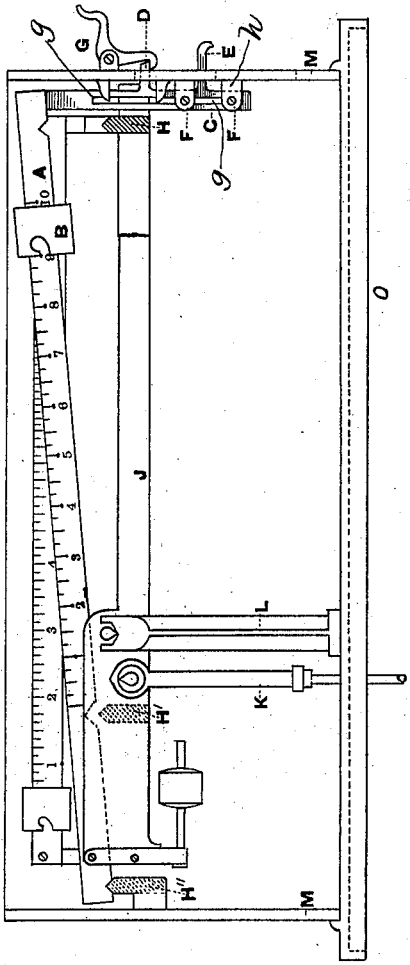
WITNESSES:
Albert Popkins
Frank G. Brereton
INVENTOR
Robert W. Romig
BY
Sturtevant & Ridley
ATTORNEYS No. 756,710. Patented April 5, 1904.

UNITED STATES PATENT OFFICE.

ROBERT W. ROMIG, OF PITTSBURG, PENNSYLVANIA, ASSIGNOR TO THE E. & T. FAIRBANKS & COMPANY, OF ST. JOHNSBURY, VERMONT, A CORPORATION OF VERMONT.

INGREDIENT-SCALE.

SPECIFICATION forming part of Letters Patent No. 756,710, dated April 5, 1904.

Application filed November 18, 1903. Serial No. 181,712. (No model.)

*To all whom it may concern:*

Be it known that I, ROBERT W. ROMIG, a citizen of the United States, residing at Pittsburg, in the county of Allegheny, State of Pennsylvania, have invented certain new and useful Improvements in Ingredient-Scales, of which the following is a description, reference being had to the accompanying drawings, and to the letters of reference marked thereon.

The present invention relates to an improvement in scales adapted especially to weigh set proportions of different ingredients entering into the composition of any mixture or manufactured product, such scales being of most common use in weighing the charges supplied to blast-furnaces.

A well-known Fairbanks type of ingredient-scale is shown and described in the patent issued W. J. Miller, August 16, 1881, No. 245,853, and the present invention is designed as an improvement on the structure of scale set forth in said patent, the special advantages thereover arising from greater simplicity of construction, fewer parts, and consequent less liability of disarrangement. Reference may be had to said patent for general features of construction of a scale of this character.

The invention consists in the various matters hereinafter described, and referred to in the appended claims.

The invention is illustrated in the accompanying drawings, in which—

Figure 1 is a front elevation of the scale-beam box open to show the beams and the various features of my invention, in this figure an ingredient-beam being shown as in position for use. Fig. 2 is a similar view showing the ingredient-beam removed from operative position. Fig. 3 is an end view, partly in section, of Fig. 1; and Fig. 4 is a detail elevation of one of the ingredient-beams.

In the drawings, O represents the base of the beam-box, and M the ends thereof. On the base are supported standards L, in which the main beam is pivoted, this beam having the side bars J, having knife-edge pivot-supports on the standards and having the cross-bars H H'. From the short arm of the main beam depends a loop K, connected with the upper end of the steelyard-rod $l$. These parts are constructed, it will be seen, not materially different from the corresponding parts of the scale illustrated in the aforesaid patent, except that in the present device the cross-bar H' on the short arm of the beam is moved nearer to the lever-fulcrum. In the aforesaid patent the ingredient-beams herein shown at A, with poises B, were bodily raised from the main beam by means of forked sliding bars at each end of the beam-box, moving in vertical guides and connected by horizontal toggle-levers. By my present invention I am enabled to dispense with the toggle-levers and their supports and to omit the vertical lifting-bars from the short-arm end of the beam.

As shown, each ingredient-beam A has three notches I I' I'' upon its under surface, the notches I I' being adapted to rest on the knife-edge tops of cross-bars H H', respectively, when the beam is in position for use. The notch I'' is arranged when the beam is in use to be out of engagement with the knife-edge top of a cross-bar H'', attached to the inner side of the beam-box adjacent the end of the short arm of the main lever; but when the beam A is raised off the cross-bars by tilting its front end the notch I'' will rest on the cross-bar H'' and the ingredient practically be pivoted therein. It will be noticed that the tops of the cross-bars H H' and the apexes of the notches I I' are practically respectively in the same horizontal plane, while the top of cross-bar H'' and apex of notch I'' are not in the same plane with the other cross-bars and notches. It is only necessary that the notch I'' and cross-bar H'' should be so related to each other and to the other cross-bars and notches that when the ingredient-beam is in use the cross-bar H'' exerts no supporting effect on the beam A; but when the beam is raised from the main-beam cross-bars it will be, in effect, pivotally supported on the cross-bar H'' or on a stationary part of the machine-framework.

Attached to the inner side of the beam-box end adjacent to the end of the long arm of the main beam are vertical lifting-bars C. There is one such bar for each ingredient-beam, the top of each bar being located underneath its corresponding beam. Each lifting-bar C has a vertical slot $g$, through which pass pins F, attached to lugs $h$ on the front end support M. By this arrangement correct vertical guidance is given each lifting-bar C. Each bar C has a lifting-handle or thumb-piece E extending out through the end of the beam-box, and has also an extending lug D adapted to be engaged by a pivoted catch G when the bar is raised to the full height. To place a beam out of commission, therefore, the lifting-bar C is raised by means of the thumb-piece E until the projecting arm D is engaged by the latch G. The ingredient-beam is then in the position indicated by Fig. 2, one end being supported by the lifting-bar C, the other end resting on the knife-edge of the bar H'', with notches I I' raised clear of the cross-bar H H'.

Various minor modifications and changes may be made without departing from the spirit of my invention.

Having thus described my invention, what I claim, and desire to secure by Letters Patent, is—

1. In a weighing-scale, a suitable framework a main beam, and supplemental beams adapted when in use to be supported on the main beam, means for raising each supplemental beam from the main beam, and transferring its support at the rear to a stationary part of the machine-frame; substantially as described.

2. In a weighing-scale, a suitable framework a main beam having supports thereon, ingredient-beams engaging said supports, a supplemental stationary support on the framework, arranged beneath a coöperating portion of the ingredient-beams, said supplemental support and coöperating portion being arranged to engage, when the ingredient-beam is elevated from the main beam; substantially as described.

3. The ingredient-beam having the notches, the main beam having cross-bars engaging certain of said notches, and a third stationary cross-bar arranged in a plane below the plane of the other cross-bars, and beneath the notch on the rear of the ingredient-beam; substantially as described.

4. In a scale of the character described, the vertical bars C, having the slots, guiding-pins extending through said slots, thumb-pieces on said bars, extensions D, and pivoted catches adapted to engage the extensions D; substantially as described.

5. In a weighing-scale of the character described the main beam and the ingredient-beams having coöperating knife-edge supports and notches, a stationary support in a plane below the plane of the supports on the main beam, each ingredient-beam on its rear edge being notched to engage said support, when lifted from its supports on the main beam; substantially as described.

In testimony whereof I affix my signature in presence of two witnesses.

ROBERT W. ROMIG.

Witnesses:
J. H. CONWAY,
JAMES T. CLARKE.